United States Patent
Parker, Jr. et al.

(10) Patent No.: US 10,422,706 B1
(45) Date of Patent: Sep. 24, 2019

(54) FIBER OPTIC TEMPERATURE SENSORS WITHIN INERT GAS FOR CRYOGENIC ENVIRONMENTS

(71) Applicant: United States of America as Represented by the Administrator of NASA, Washington, DC (US)

(72) Inventors: Allen R. Parker, Jr., Lancaster, CA (US); Anthony Piazza, Palmdale, CA (US); Hon Man Chan, Canyon Country, CA (US); Ryan M Warner, Lancaster, CA (US)

(73) Assignee: United States of America as Represented by the Adminstrator of the National Aeronautics and Space Adminstration, Washington, DC (US)

( * ) Notice: Subject to any disclaimer, the term of this patent is extended or adjusted under 35 U.S.C. 154(b) by 13 days.

(21) Appl. No.: 16/021,499

(22) Filed: Jun. 28, 2018

(51) Int. Cl.
| | |
|---|---|
| *G01K 13/00* | (2006.01) |
| *G01K 11/32* | (2006.01) |
| *G02B 6/44* | (2006.01) |
| *G02B 6/02* | (2006.01) |
| *G01L 1/24* | (2006.01) |

(52) U.S. Cl.
CPC ........ *G01K 13/006* (2013.01); *G01K 11/3206* (2013.01); *G01L 1/246* (2013.01); *G02B 6/02104* (2013.01); *G02B 6/02204* (2013.01); *G02B 6/443* (2013.01)

(58) Field of Classification Search
CPC ............. G01K 13/006; G01K 11/3206; G02B 6/02104; G02B 6/443; G02B 6/02204; G01L 1/246
See application file for complete search history.

(56) References Cited

U.S. PATENT DOCUMENTS

| | | | | |
|---|---|---|---|---|
| 6,072,922 A * | 6/2000 | Albin | ..................... | G01K 11/32 374/E11.015 |
| 6,301,775 B1 * | 10/2001 | Piazza | ................... | G01L 1/2281 156/247 |
| 6,566,648 B1 | 5/2003 | Froggatt | | |
| 6,879,852 B1 * | 4/2005 | Mueller | ............. | G01R 33/3614 600/407 |
| 8,182,433 B2 * | 5/2012 | Leo | ........................ | A61B 90/06 600/587 |
| 8,571,368 B2 * | 10/2013 | Rinzler | ................ | G02B 6/4402 29/428 |
| 8,700,358 B1 * | 4/2014 | Parker, Jr. | .......... | G01D 5/35316 250/227.14 |
| 8,879,876 B2 * | 11/2014 | Rinzler | ................ | G02B 6/4402 385/104 |
| 8,909,040 B1 * | 12/2014 | Parker, Jr. | ................. | G02B 6/35 398/25 |
| 8,970,845 B1 * | 3/2015 | Chan | ...................... | G01B 11/18 356/478 |
| 9,009,003 B1 * | 4/2015 | Chan | .................. | G01D 5/35316 356/477 |

(Continued)

*Primary Examiner* — Andrew Jordan
(74) *Attorney, Agent, or Firm* — Michael Vallan

(57) ABSTRACT

The present invention is a temperature sensor for cryogenic systems using a fiber optic interrogation system that is capable of a large number of temperature readings across the cryogenic environment at high resolutions. The invention also includes a method of using such a system to measure temperatures in a cryogenic environment and a method of making such a system.

12 Claims, 2 Drawing Sheets

(56) References Cited

U.S. PATENT DOCUMENTS

| | | | |
|---|---|---|---|
| 9,074,921 B1* | 7/2015 | Parker, Jr. | G01F 23/22 |
| 9,347,271 B2* | 5/2016 | Zediker | E21B 7/14 |
| 9,444,548 B1* | 9/2016 | Hamory | H04B 10/25 |
| 9,664,506 B2* | 5/2017 | Parker, Jr. | G01B 11/165 |
| 9,952,107 B2* | 4/2018 | Blumenkranz | G01L 1/246 |
| 9,964,698 B1* | 5/2018 | Noddings | G02B 6/02042 |
| 2006/0200049 A1* | 9/2006 | Leo | A61B 90/06 |
| | | | 600/587 |
| 2010/0061678 A1* | 3/2010 | Swinehart | B29D 11/00663 |
| | | | 385/12 |
| 2010/0229662 A1* | 9/2010 | Brower | F16L 59/141 |
| | | | 73/865.8 |
| 2018/0120500 A1* | 5/2018 | Noddings | G02B 6/02042 |

* cited by examiner

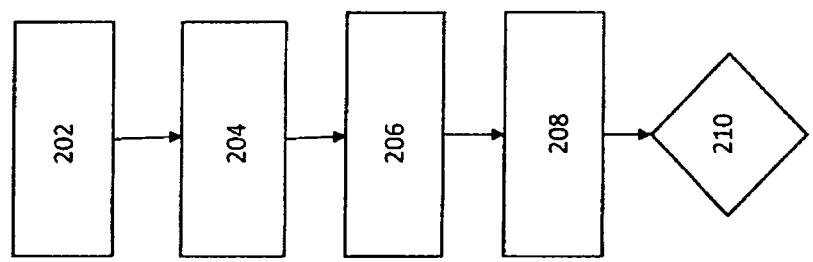

FIBER OPTIC TEMPERATURE SENSORS WITHIN INERT GAS FOR CRYOGENIC ENVIRONMENTS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to temperature sensors for cryogenic environments and more particularly to fiber optic sensors for cryogenic environments.

2. Description of the Related Art

Measuring temperatures in cryogenic environments can be difficult. In a closed system, when a cryogenic tank, which is partial gas and partial liquid, pre-cooled and at steady state, the temperature difference between gas and liquid is very small, especially near the transition region between gas and liquid. Because of this decreasing temperature difference between the cryogenic liquid and the gas approaching the transition region, achieving high temperature resolutions becomes increasingly more challenging.

Current methods employed to measure temperatures in cryogenic environments use thermocouples or silicon diodes, with silicon diodes being more accurate. In order to achieve distributed temperature sensing along the length of cryogenic tank, the silicon diodes are strategically placed along a ribbon which is then placed within or on the surface of that tank. These diodes have a high degree of precision and accuracy and are able to resolve temperatures of about 0.1 C.

While this approach works, the application is limited to the number of diodes one is able to mount on the ribbon (each diode provides a single point measurement) and each diode must include associated wiring, etc. in order to operate; this makes the system more problematic to install and maintain as one increases the number of diodes.

While optical fibers containing Fiber Bragg gratings attached to a fiber optic interrogation system can be used to measure temperature based on changes in strain along said fiber, employing this method in cryogenic environments is problematic. The optical fibers would require mechanical protection in such environments (such as PTFE tubing). However, both air and moisture may cause frozen adhesion of an optical fiber to PTFE tube walls at cryogenic temperatures. These adhesions produce unwanted strains induced into the fiber temperature measurement. This strain occurs when uneven thermal contraction happens between fiber, tubing, and surrounding structure.

Therefore, it is desired to provide an improved temperature sensor system that allows for high resolution temperature readings, a large number of readings across a cryogenic environment, and is easy to install and maintain.

SUMMARY OF THE INVENTION

The invention proposed herein comprises a temperature sensor for cryogenic systems using a fiber optic interrogation system that is capable of a large number of temperature readings across the cryogenic environment at high resolutions. The invention also includes a method of using such a system to measure temperatures in a cryogenic environment and a method of making such a system as discussed further below.

Accordingly, it is an objective of this invention to provide high resolution temperature sensing in cryogenic environments.

It is another objective to provide a large number of temperature readings across a cryogenic environment.

This invention meets these and other objectives related to temperature sensing in cryogenic environments by providing an optical fiber having a plurality of Fiber Bragg gratings, wherein moisture is removed from at least a portion of the coating of the optical fiber. A protective tubing is enclosed over one end of the optical fiber and encases at least a portion of the optical fiber, sealed on the fiber. The tubing is filled with an inert gas and a fiber optic interrogation system attached to the free end of the optical fiber to obtain temperature readings when the device is deployed in a cryogenic environment.

BRIEF DESCRIPTION OF THE DRAWINGS

In the drawings, which are not necessarily to scale, like or corresponding parts are denoted by like or corresponding reference numerals.

FIG. 2 depicts a flow chart of the steps used to make the embodiment of the present invention depicted in FIG. 1.

DESCRIPTION OF PREFERRED EMBODIMENTS

Figure 1:
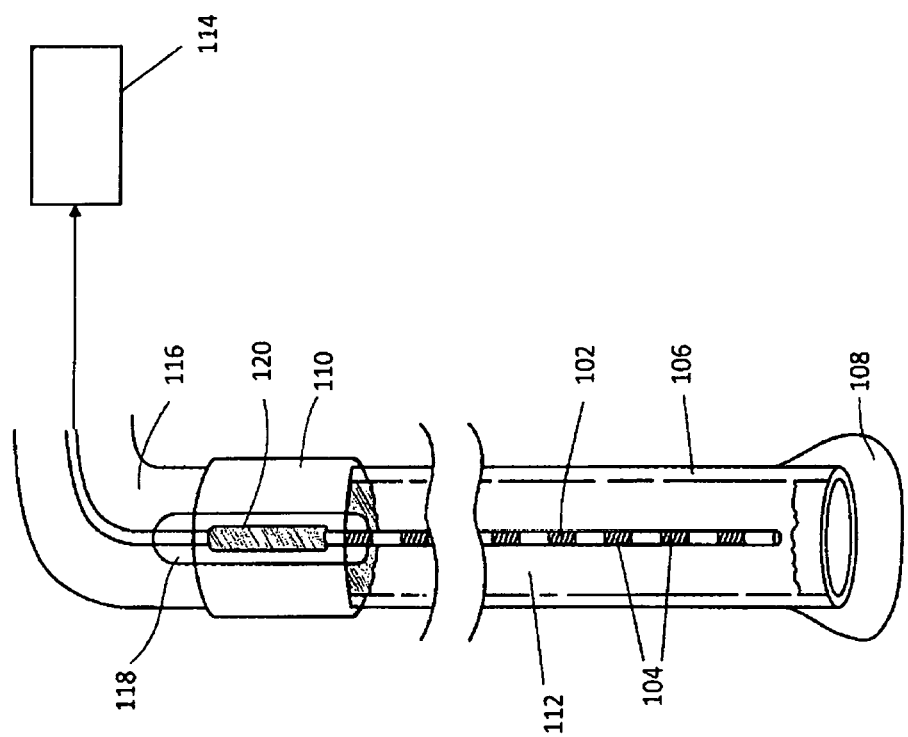
FIG. 1 depicts an embodiment of the present invention showing an optical fiber having a plurality of FBG sensors encased in a sealed tubing that contains an inert gas that has a freezing point below that of the targeted cryogenic environment temperature.

The present invention is an improved sensor for measuring temperatures in cryogenic environments. Fiber Bragg grating (FBG) sensors, which are basically gratings along an optical fiber that act as translucent mirrors to light sources, provide many attractive characteristics compared to other sensing systems, including light weight and small size. These features enable using many sensors multiplexed onto a single optical fiber. Thus, a user can interrogate each sensor independently and obtain a distributed measurement over large structures. Because the FBGs are multiplexed on a single fiber, many sensors can be accessed with a single connection to an optical source and detector.

Because changes in temperature cause index of refraction and length changes on an optical fiber, FBG sensors can be employed as temperature sensors. However, when deploying optical fiber based sensors in cryogenic environments, protection is required to isolate sensors from mechanical strains and protect the fiber. This normally comprises some type of polymer tubing, for example PTFE, that would surround the optical fiber.

The present inventors have determined that both air and moisture may cause frozen adhesion of an optical fiber to PTFE tube walls at cryogenic temperatures. These adhesions produce unwanted mechanical strains induced into the fiber temperature measurement, giving erroneous temperature readings from the optical fiber sensor system.

In order to obviate this issue, the present invention comprises an FBG optical sensor that is not impacted by air or moisture at cryogenic temperatures by providing an optical fiber having a plurality of FBG sensors wherein absorbed moisture from the optical fiber coating is removed. The fiber is encased in a sealed tubing that contains an inert gas that has a freezing point below that of the targeted cryogenic environment temperature. This prevents any moisture or air from impacting the fiber.

Referring to FIG. 1, the invention comprises an optical fiber 102 having a plurality of FBGs 104 thereon. Such optical fibers 102 normally have a polyimide coating applied on them for mechanical protection. Such coatings tend to absorb moisture. Because such moisture can have a detrimental effect on temperature readings in cryogenic environments as discussed above, the coating on the optical fiber 102 would have such moisture removed.

The portion of the optical fiber 102 that will be used as a temperature sensor in a cryogenic environment is encased in a protective tubing 106. The tubing 106 is sealed over an end 108 of the fiber 102 and also sealed at the base of the fiber 102 adjacent to the other end 110 of the fiber 102.

Prior to sealing the fiber 102 in the plastic tubing 106, both elements are subjected an inert gas 112, preferably in an environmentally controlled chamber as discussed further below, so that once the tubing is sealed, the inert gas 112 remains within the tubing 106.

The end 110 of the fiber is attached to a fiber optic interrogation system 114 which allows the fiber 102 to be interrogated to obtain temperature measurements along the fiber 102.

The fiber 102 may be a single-mode, continuous FBG fiber that includes four sensors per inch of fiber and is approximately six feet in length or it may be a standard optical fiber with FBGs continually spaced (for example every one or two centimeters). A preferred fiber 102 is about 0.0055 inches in diameter at 1542 nm center wavelength. However, one skilled in the art may select different configurations of the fiber 102 depending upon the size of the cryogenic environment being measured and the resolution of temperature sensing desired.

The protective tubing 106 length should be sized so that it can cover the amount of fiber 102 desired for the cryogenic environment being measured. A preferred diameter of the protective tubing is about 0.035 inches in diameter so that the fiber 102 can be placed within; however, this size can be modified by one skilled in the art depending upon the sizes of fiber 102 as well as the type of material of tubing 106.

The protective tubing 106 should be constructed of a material that protects the physical integrity of the fiber 102 the tubing 106 is placed within a cryogenic environment as described herein. A preferred material for the protective tubing 106 is polytetrafluoroethylene, but many polymer-based materials that feature low absorption may be used.

The protective tubing 106 may be sealed over the fiber 102 using methods that create an air tight seal. One preferred sealing method is applying an epoxy to both ends to be sealed and allowing the epoxy time to fully cure.

The inert gas 112 should be a moisture-free gas that will not freeze under cryogenic conditions. Examples of preferred inert gases 112 include helium and argon.

In a preferred embodiment, the free end 110 of the fiber 102 is attached to the fiber optic interrogation system 114 via a standard telecommunication patch fiber 116. The patch fiber 116 is preferably attached to the fiber 102 by a fusion splice. A mechanical support tube 118 may be used as mechanical support for the fusion splice and the patch fiber 116. The patch fiber 116 would then be connected directly into the fiber optic interrogating system 114.

The fiber optic interrogating system 114 should be capable of interrogating the fiber 102 and providing strain/temperature data. Such a system 114 normally includes a linearly swept, mode hop free C-band tunable laser, an optical multi-channel network, optical to electrical amplifier circuit, analog to digital converter interface and a processing engine; for example, that set forth in U.S. Pat. No. 6,566,648, which is incorporated by reference herein.

The invention also includes a method of using the system described above in order to measure temperatures in a cryogenic environment. In practice, the free end of the optical fiber would be attached to the fiber optic interrogation system. The portion of the optical fiber encased by the protective tubing would be placed in a cryogenic environment (for example, a cryogenic storage tank). This sensor portion could be affixed on a side of the environment or simply dangled therein. The optical fiber is interrogated via the light source of the fiber optic interrogation system and readings are taken in order to obtain wavelength values from the FBG sensors to get temperature measurements. One preferred method of getting temperature readings from the wavelength measurements is to run tests associated with different cryogenic environments and fit the readings to said test results.

Finally, the invention also comprises a method of making in improved temperature sensor system for cryogenic environments.

Referring to FIG. 2, the first step 202 in making the present invention is to fusion splice a telecommunication patch fiber onto one end the optical fiber that is encased in a protective tubing, as described above, within the chamber. A mechanical support tube may be applied to the fusion splice.

The next step 204 is to place the optical fiber and telecommunication patch fiber in an environmentally controlled chamber. Preferably a helium/oxygen mixture is pumped into the chamber. The environmentally controlled chamber should be sufficient to remove air by methods known by those skilled in the art, preferably by pumping in an inert gas. The chamber must be accessible to manipulate the elements within the chamber as discussed herein. This is normally done via plastic gloves in a side of the chamber so a user may insert their hands within the gloves to access elements within the chamber without contamination.

The next step 204 is to fusion splice a telecommunication patch fiber onto one end the optical fiber within the chamber. A mechanical support tube may be applied to the fusion splice.

The next step 206 is to remove moisture from the coating of the optical fiber comprising a plurality of FBGs. The preferred way to remove such moisture is pump an inert gas through the protective tubing for a selected period of time. However, other methods of removing the moisture from the optical fiber may be employed including baking the fiber or using ultraviolet light. The amount of air/moisture removal can be selected by the user. For the present invention, preferably removal in the hundreds of parts per million is preferred. The inert gas may also be selected by one skilled in the art. It should not freeze at cryogenic temperatures and should be moisture-free. Examples include helium and argon.

The next step 208 is to seal the ends of the tubing that encase the optical fiber. This is done by applying the adhesive over the ends of the protective tubing. Preferably, if an epoxy is used as an adhesive, a user can apply the epoxy over the end of the tubing and the epoxy should be allowed to cure until the epoxy has hardened. Other methods of sealing the tubing may be employed by those skilled in the art in order to create an air-tight seal.

The final step 210 is to remove the optical fiber/telecommunication patch fiber from the chamber and attach a free end of the telecommunication patch fiber to a fiber optic interrogation system to obtain an operational temperature sensor for cryogenic environments.

What is described herein are specific examples of many possible variations on the same invention and are not intended in a limiting sense. The claimed invention can be practiced using other variations not specifically described above.

What is claimed is:

1. A temperature sensor for cryogenic systems, comprising:
   an optical fiber comprising a plurality of Fiber Bragg gratings, wherein moisture is removed from at least a portion of a coating of the optical fiber;
   a protective tubing enclosed over one end of the optical fiber and encasing the at least a portion of the optical fiber wherein the protective tubing and portion of the encased optical fiber are sealed;
   an inert gas within the enclosed protective tubing; and,
   a fiber optic interrogation system attached to a free end of the optical fiber to obtain temperature readings when the temperature sensor is deployed in a cryogenic system.

2. The temperature sensor of claim 1, wherein the interrogation system is attached to the optical fiber via a telecommunication patch fiber.

3. The temperature sensor of claim 2, wherein the telecommunication patch fiber is attached to the optical fiber by a fusion splice.

4. The temperature sensor of claim 3, further comprising a mechanical support tube over the fusion splice.

5. The temperature sensor of claim 3, wherein the inert gas comprises helium.

6. The temperature sensor of claim 1, wherein the inert gas comprises a moisture free gas that does not freeze at cryogenic temperatures.

7. A method of sensing temperatures in a cryogenic environment, comprising the steps of:
   providing an optical fiber comprising a plurality of Fiber Bragg gratings, wherein moisture is removed from at least a portion of a coating of the optical fiber, a protective tubing enclosed over one end of the optical fiber and encasing the at least a portion of the optical fiber wherein the protective tubing and portion of the encased optical fiber are sealed, with an inert gas within the enclosed protective tubing;
   attaching a free end of the optical fiber to a fiber optic interrogation system;
   placing the encased at least a portion of the optical fiber in a cryogenic environment; and,
   interrogating the optical fiber to obtain temperature measurements within the cryogenic environment.

8. A method of making a temperature sensor for cryogenic environments, comprising the steps of:
   removing moisture from a coating of an optical fiber comprising a plurality of Fiber Bragg grantings;
   placing the optical fiber, a portion of protective tubing, open at both ends, and adhesive in an environmentally controlled chamber;
   purging the chamber with an inert gas to remove air;
   placing the optical fiber within the tubing;
   sealing both ends of the tubing around the optical fiber with the adhesive; and,
   removing the tubing and optical fiber from the chamber and attach a free end of the optical fiber to a fiber optic interrogation system.

9. The method of making a temperature sensor of claim 8, wherein the step of removing moisture comprises pumping an inert gas through the protective tubing.

10. The method of making a temperature sensor of claim 9, wherein the inert gas comprises a moisture free gas that does not freeze at cryogenic temperatures.

11. The method of making a temperature sensor of claim 8, wherein the adhesive comprises an epoxy.

12. The method of making a temperature sensor of claim 11, wherein the step of sealing comprises applying the epoxy on each end of the protective tubing and allowing the epoxy to cure.

* * * * *